(12) United States Patent
Smith

(10) Patent No.: US 7,782,364 B2
(45) Date of Patent: Aug. 24, 2010

(54) MULTI-ARRAY SENSOR WITH INTEGRATED SUB-ARRAY FOR PARALLAX DETECTION AND PHOTOMETER FUNCTIONALITY

(75) Inventor: Scott Smith, Saratoga, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 335 days.

(21) Appl. No.: 11/842,345

(22) Filed: Aug. 21, 2007

(65) Prior Publication Data

US 2009/0051793 A1 Feb. 26, 2009

(51) Int. Cl.
*H04N 5/225* (2006.01)
*H04N 7/14* (2006.01)

(52) U.S. Cl. .................. 348/218.1; 348/14.16; 382/167; 358/518

(58) Field of Classification Search .............. 348/14.16, 348/333.09, 218.1
See application file for complete search history.

(56) References Cited

U.S. PATENT DOCUMENTS

| | | | |
|---|---|---|---|
| 4,736,247 | A | 4/1988 | Graham et al. |
| 4,978,983 | A * | 12/1990 | St.ANG.lfors ............... 396/89 |
| 5,732,293 | A | 3/1998 | Nonaka et al. |
| 5,815,746 | A | 9/1998 | Masuda |
| 6,577,821 | B2 | 6/2003 | Malloy Desormeaux |
| 6,839,087 | B1 | 1/2005 | Sato |
| 6,961,157 | B2 * | 11/2005 | Tandon et al. ............... 358/512 |
| 7,092,625 | B2 | 8/2006 | Nonaka |
| 2003/0030740 | A1 | 2/2003 | Tsujino |
| 2003/0138248 | A1 | 7/2003 | Bittner |
| 2007/0182819 | A1 * | 8/2007 | Monroe ....................... 348/143 |
| 2008/0043106 | A1 * | 2/2008 | Hassapis et al. ............. 348/153 |
| 2009/0174804 | A1 * | 7/2009 | Iijima et al. ................. 348/340 |

FOREIGN PATENT DOCUMENTS

| | | |
|---|---|---|
| EP | 1 637 836 A1 | 3/2006 |
| EP | 1677518 A | 7/2006 |
| EP | 1912434 A | 4/2008 |
| WO | WO 93/11631 | 6/1993 |
| WO | WO 99/30269 | 6/1999 |
| WO | WO2007/013250 | 2/2007 |

OTHER PUBLICATIONS

Agnieszka Arias-Kraska, Communication Relating to the Results of the Partial International Search, PCT/US2008/072995, Dec. 15, 2008.
Agnieszka Arias-Kraska, Authorized Officer, International Search Report and Written Opinion for PCT/US2008/072995, WO 2009/026064, Feb. 25, 2009.
Tanaka et al., "Development of a Video-Rate Range Finder Using Dynamic Threshold Method for Characteristic Point Detection", IEEE, 1999, pp. 932-937.
Lenny Lipton, "Vertical Surround Parallax Correction", www.reald.com/_resources/vertical.pdf.

* cited by examiner

*Primary Examiner*—Sinh Tran
*Assistant Examiner*—Hung H Lam
(74) *Attorney, Agent, or Firm*—RatnerPrestia

(57) ABSTRACT

Methods and systems of imaging to correct parallax. Color information is received from multi-array sensors. Luminance information is received from a sub-array sensor arranged with the multi-array sensors. Color information received from at least one of the multi-array sensors is correlated with the luminance information received from the sub-array sensor. Color information is shifted among the multi-array sensors, based on the correlation, to correct the parallax.

17 Claims, 12 Drawing Sheets

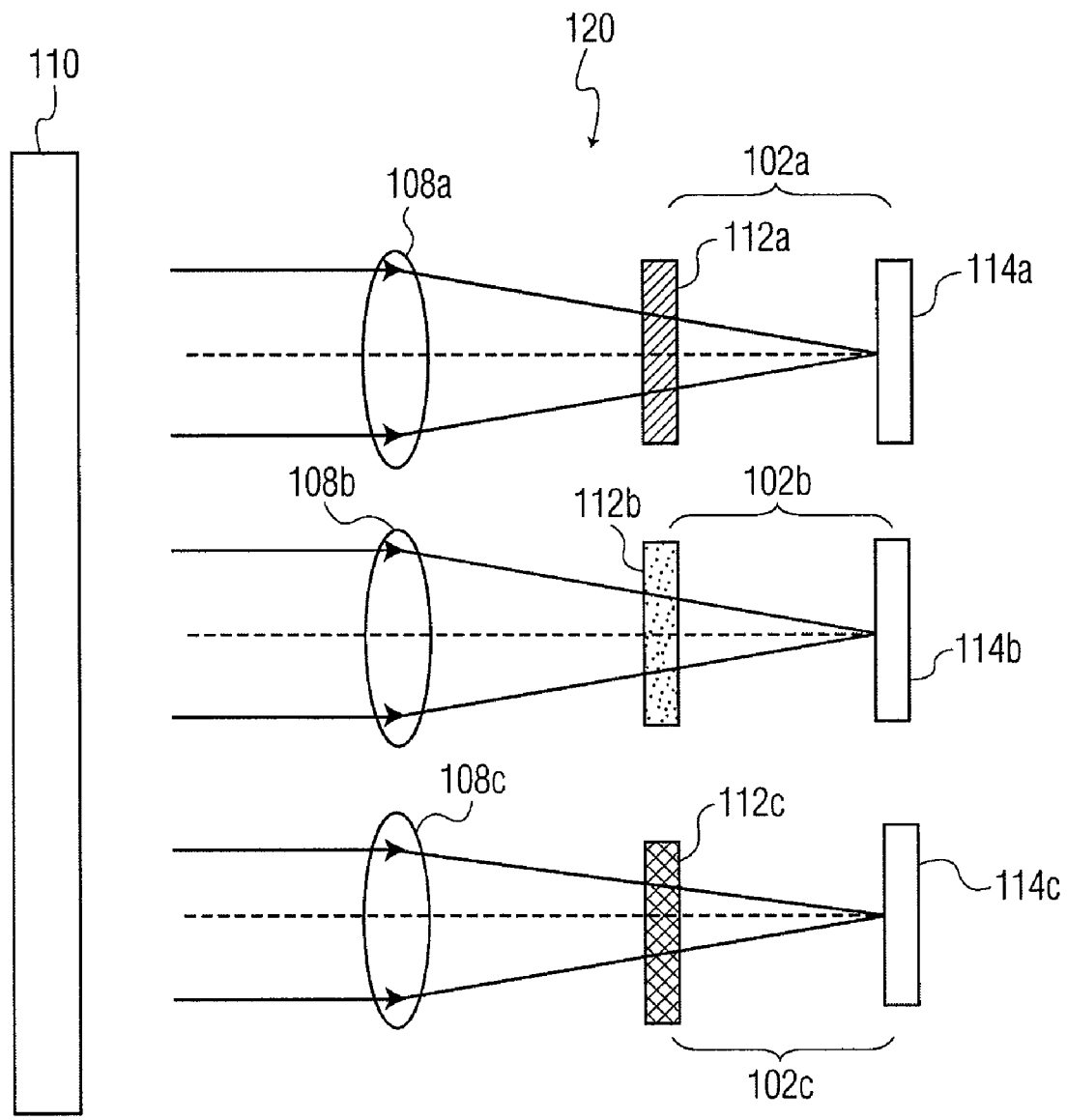
 → RED   → GREEN   → BLUE
FIG. 1B

US 7,782,364 B2

MULTI-ARRAY SENSOR WITH INTEGRATED SUB-ARRAY FOR PARALLAX DETECTION AND PHOTOMETER FUNCTIONALITY

FIELD OF THE INVENTION

The present invention relates to CMOS imagers and, more particularly, to methods and systems for multi array imaging with parallax correction.

BACKGROUND OF THE INVENTION

Image capture devices such as digital cameras, desktop cameras attached to personal computers, and cameras built into mobile telephones, typically have a single lens through which light that is received from an object to be photographed. The light is typically directed from the single lens onto a charge-coupled device (CCD) sensor array, or alternatively, a complementary metal oxide semiconductor (CMOS) sensor array. Because most of these cameras are color cameras, a pixilated color filter is interposed between the lens and the sensor array. The color filter normally contains an array of red, green, and blue filter elements. Each element of the color filter, regardless of the color transmitted through the element, is aligned with a sensor element located in the sensor array. Such an alignment enables color pixel information to be captured in the sensor array. The color pixel information is then processed to generate a color image of the object.

The single-lens camera suffers from several handicaps, such as limited image resolution, poor color imaging, and improper luminance imaging. Typically, image resolution limitations are a result of using a single sensor array containing a limited number of sensor elements. Image resolution may be improved by increasing the number of sensor elements, and such a solution has been used in several cameras where the density of sensor elements contained in the sensor array has been increased. While more needs to be done in improving sensor element density even further, it is also desirable to find alternative solutions to improving imaging resolution.

BRIEF DESCRIPTION OF THE DRAWINGS

FIG. 1B is a side diagram of an imaging device including the three array imaging sensor shown in FIG. 1A.

DETAILED DESCRIPTION OF THE INVENTION

In the following detailed description, reference is made to the accompanied drawings which form a part hereof, and which illustrates specific embodiments of the present invention. These embodiments are described in sufficient detail to enable those of ordinary skill in the art to make and use the invention. It is also understood that structural, logical or procedural changes may be made to the specific embodiment disclosed without departing from the scope of the present invention.

The various embodiments generally describe systems and methods for imaging with parallax correction. The imaging systems generally incorporate multiple lenses that are individually configured to receive visible light from an object to be imaged and to direct this light upon a corresponding multiple imaging arrays. Chrominance and/or luminance information is then derived from signals generated in one or more of the imaging arrays.

It should be understood that, taken alone, an imaging array does not distinguish one incoming color of light from another. Output signals of pixels in the imaging array represent the intensity of received light, not any indication of color information. When chrominance information is desired, an optical filter, i.e. a color filter, is interposed between a lens and a pixel array. For purposes of this disclosure, however, imaging arrays will be referred to by color (i.e., "red array", "green array", etc.) when a color filter is used in connection with pixels of the imaging array to focus a particular wavelength of light, corresponding to a particular color, onto the pixel array. It will be understood that colors such as green, blue, and red are mentioned in the exemplary embodiments below for purposes of explanation and are not intended to limit the invention to these particular colors.

Figure 1A:
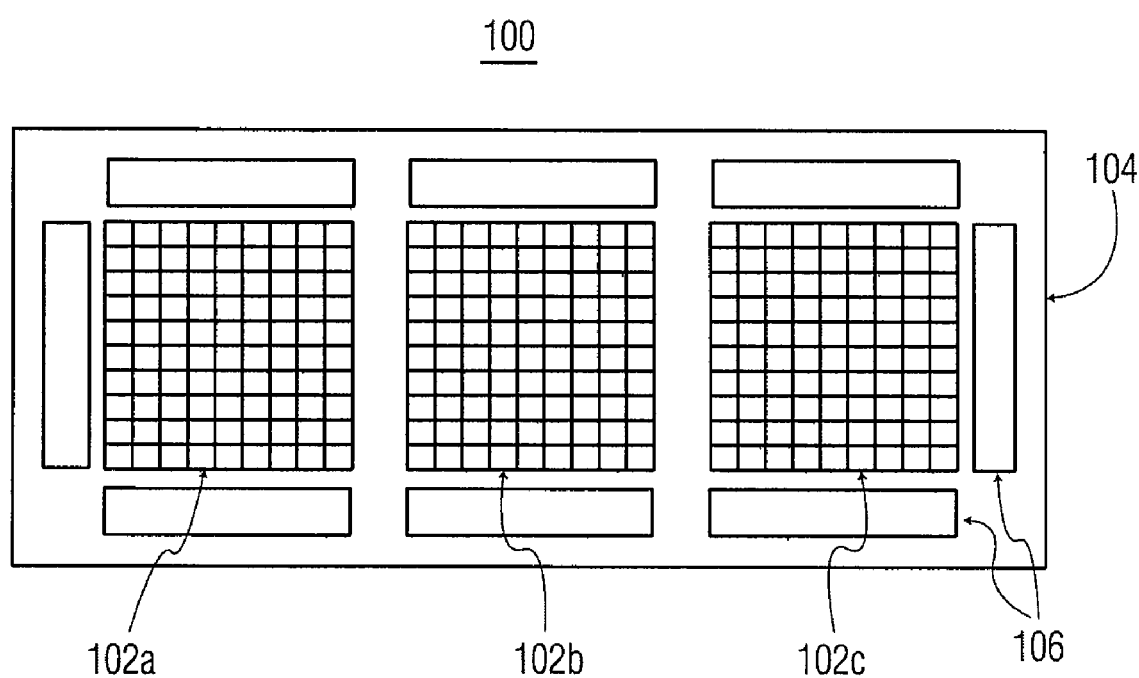
FIG. 1A is an overhead diagram of a three array imaging sensor.

FIG. 1A is an overhead diagram of a three array imaging sensor, designated generally as 100. Imaging sensor 100 includes three imaging arrays, designated generally as 102. Imaging arrays 102 include red array 102A, green array 102B and blue array 102C arranged on substrate 104. Imaging arrays 102 include support circuitry, generally designated as 106, that are used to select appropriate row and column lines of imaging arrays 102 for pixel read out.

FIG. 1B is a side diagram of an imaging device, designated generally as 120, including imaging sensor 100. Imaging device 120 includes three imaging lenses, designated generally as 108. Imaging lenses 108A, 108B, 108C receive a full spectrum of visible light from object 110 and direct the light onto respective red array 102A, green array 102B, and blue array 102C to produce chrominance information, i.e. color information. Each imaging array 102 includes a respective monochromatic color filter, generally designated as 112, and a pixel array, generally designated as 114. Color filters 112 are illustrated as red filter 112A, green filter 112B, and blue filter 112C. It is understood that color filters 112 may be any suitable colors.

Each of the filter elements of color filter 112 is optically aligned to a corresponding pixel in pixel array 114, thereby providing one pixel of chrominance information from each pixel element. The pixilated chrominance information obtained from each imaging array 102 is combined to generate an image of object 110. The resolution of the image is proportional to the number of pixels contained in the three imaging arrays 102a, 102b, 102c, and is therefore higher than a resolution typically obtained from a single lens system using a single imaging array.

Figure 2:
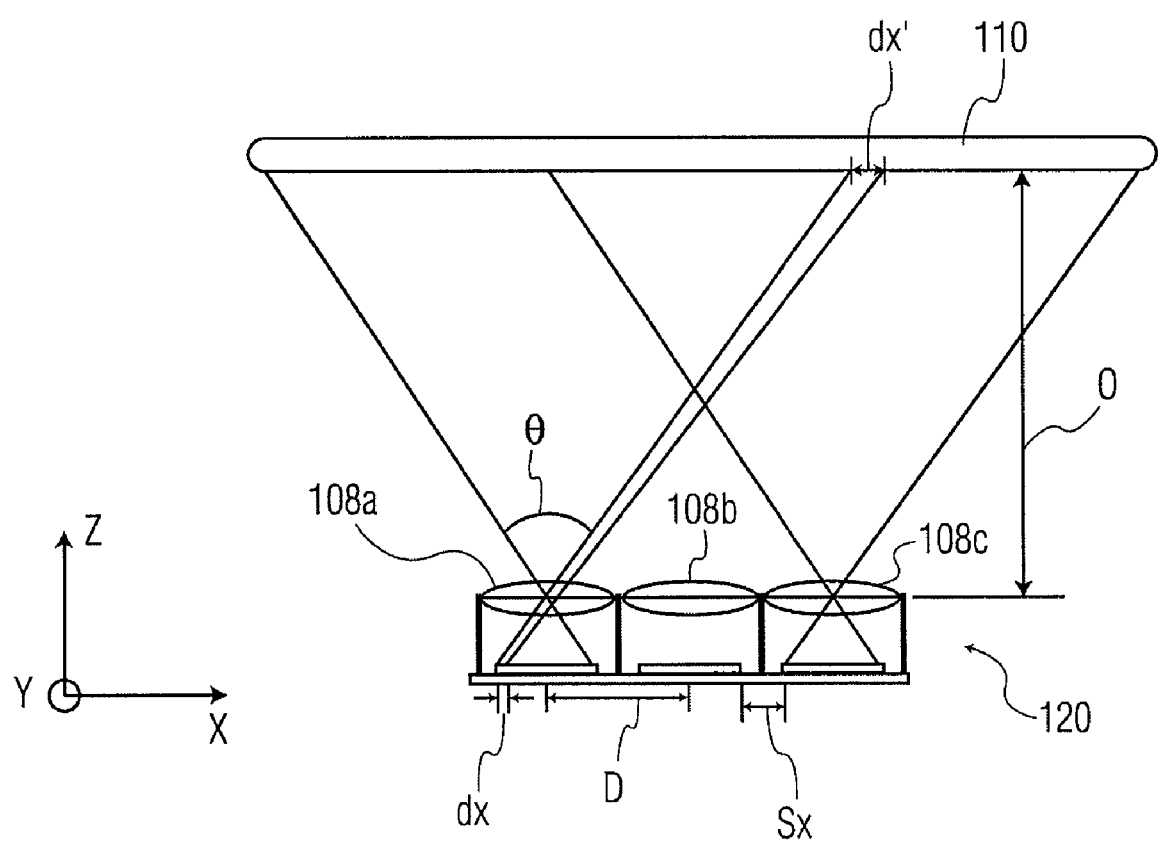
FIG. 2 is a side diagram of the imaging device shown in FIG. 1B illustrating conditions for parallax.

FIG. 2 is a side diagram of imaging device 120 illustrating conditions for parallax. In general, imaging devices, such as imaging device 120, that include multiple imaging lenses 108 may be prone to image parallax. because the multiple imaging lenses are focused on the same scene, where object distances from imaging device 120 are much less than infinity (i.e. in the near field). An amount of parallax that may occur between adjacent imaging arrays 102 typically depends on an object distance, O, and the imaging device geometry.

Typically, parallax can be determined from equation (1):

$$P[pix] = \frac{N(dx \cdot N + S_x)}{2 \cdot O \cdot \tan\left(\frac{\theta}{2}\right)} \quad (1)$$

where N represents a number of pixels in the x direction, dx represents a pixel width at the image plane, O represents the object plane distance, θ represents a lens horizontal field of view and $S_x$ represents a horizontal space between imaging arrays 102. In FIG. 2, D represents a distance between imaging arrays 102 and dx' represent a pixel pitch at the object plane of object 110. The object distance at which one pixel of parallax occurs, P=1, may be determined using equation (1) as shown by equation (2):

$$O[P = 1] = \frac{N(dx \cdot N + S_x)}{2 \cdot \tan\left(\frac{\theta}{2}\right)} \quad (2)$$

Accordingly, because the geometry of the imaging sensor is known, a minimum object distance that is susceptible to parallax may be determined.

Parallax correction may be performed by detecting object distance O and registering image information based on an appropriate pixel shift to match images captured through each lens 108 and imaging device 120. In cases where objects are colors other than black, gray, or white, information may be missing from one color plane compared with its adjacent neighbor. Because Imaging sensor 100 includes three imaging arrays 102, imaging sensor 100 may be limited in its ability to providing sufficient information on object distance O to completely generate a parallax free image, because the depth information is typically determined from different color planes.

Figure 3A:
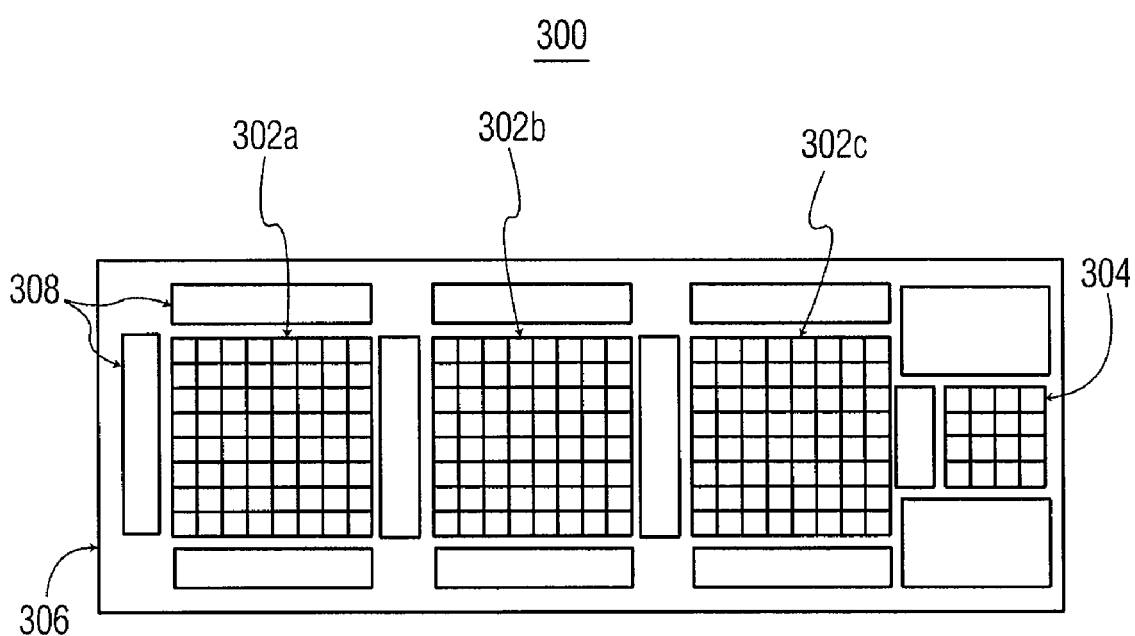
FIG. 3A is an overhead diagram of a multi-array imaging sensor according to an embodiment of the present invention.

FIG. 3A is an overhead diagram of a multi-array imaging sensor, designated generally as 300, according to an embodiment of the present invention. Multi-array imaging sensor 300 includes main arrays, designated generally as 302, and sub-array 304 provided on substrate 306. Multi-array imaging sensor 300 includes support circuitry, generally designated as 308 for selecting appropriate row and column lines of main arrays 302 and sub-array 304 for pixel read-out, and described further with respect to FIG. 5.

Figure 3B:
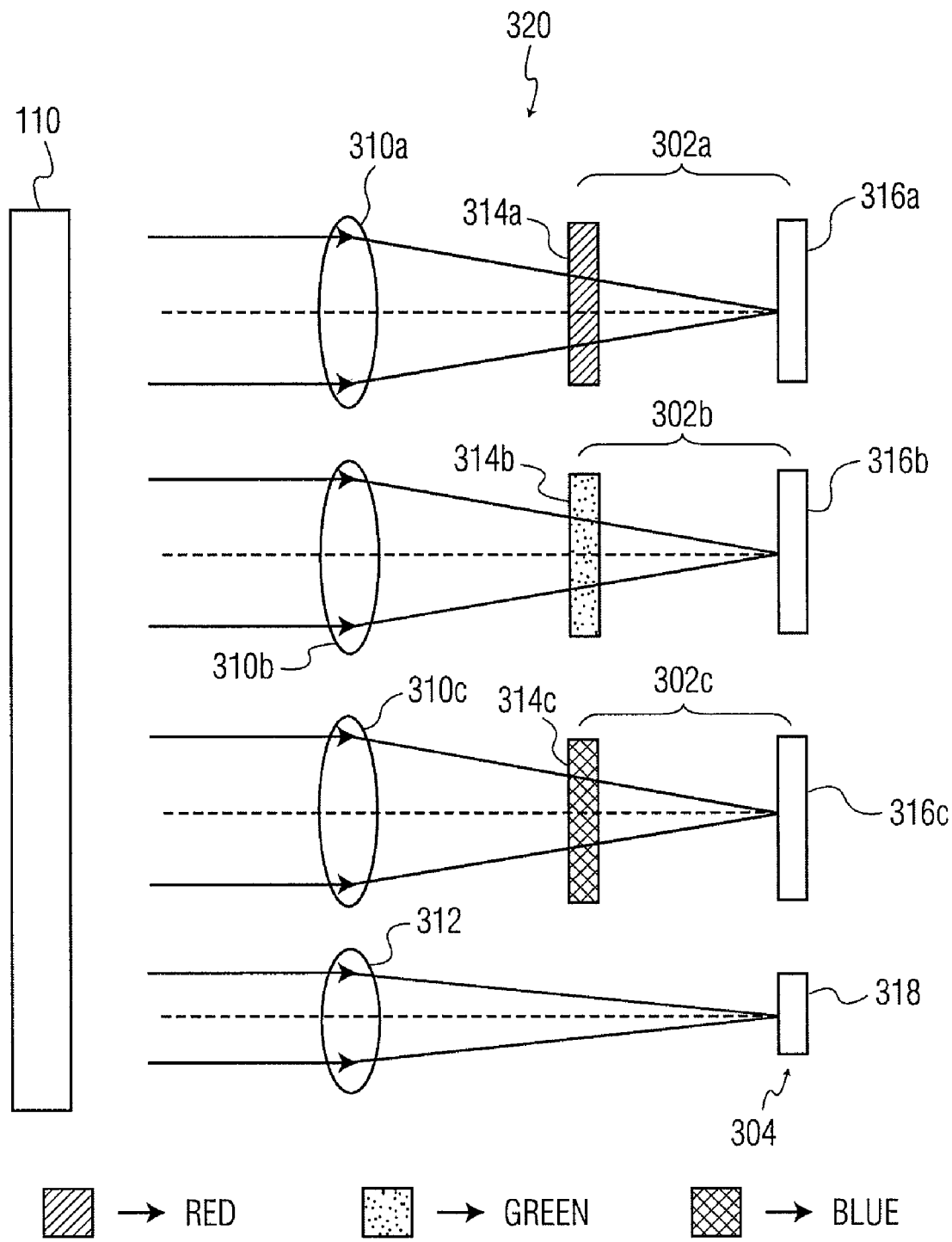
FIG. 3B is a side diagram of an imaging device including the multi-array imaging sensor shown in FIG. 3A.

FIG. 3B is a side diagram of an imaging device, designated generally as 320, that includes multi-array imaging sensor 300. Imaging device includes imaging lenses, designated generally as 310 and 312. Imaging lenses 310A, 310B, 310C and 312 receive a full spectrum of visible light from object 110 and direct the light onto respective main arrays 302A, 302B, 302C and sub-array 304.

Main arrays 302 include color filters, designated generally as 314, and pixel arrays, designated generally as 316, to provide chrominance information. Main arrays 302 are the same as imaging arrays 102 (FIGS. 1A and 1B) except that they are used as part of a multi-array sensor 300. Sub-array 304 includes pixel array 318 but does not include a color filter. Sub-array 304, thus, receives the full spectrum of visible light onto pixel array 318 to provide luminance information of the full visible spectrum.

Figure 4A:
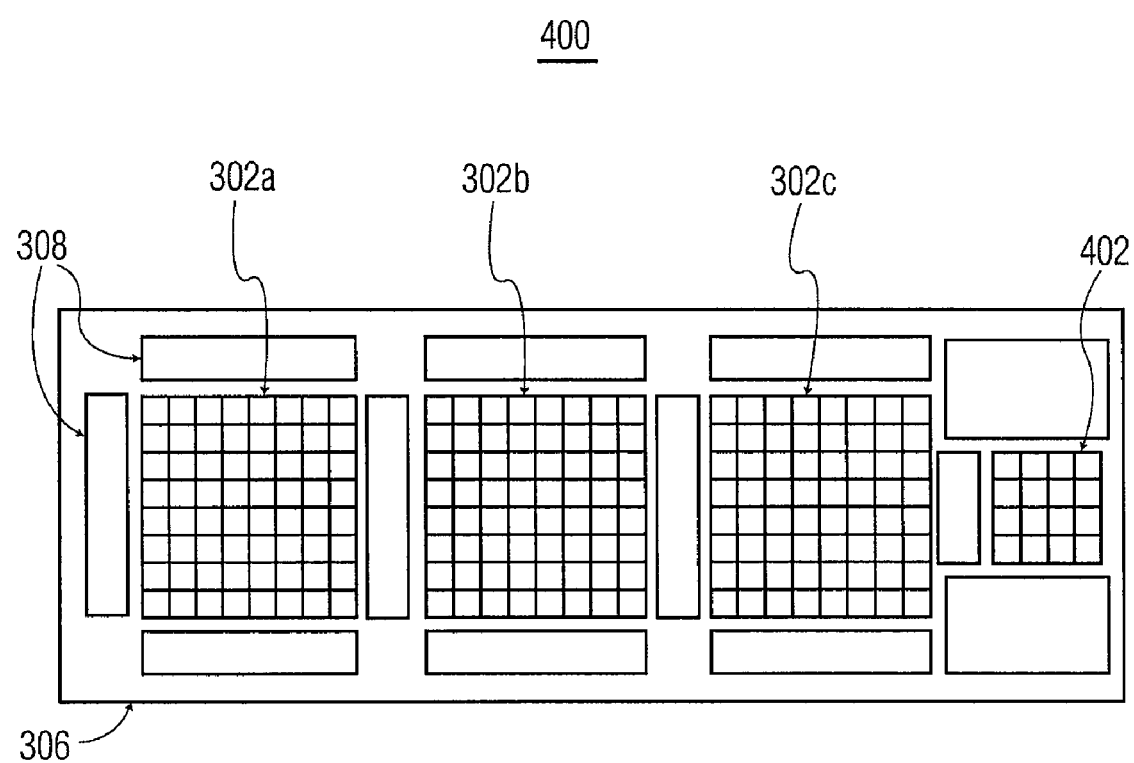
FIG. 4A is an overhead diagram of a multi-array imaging sensor according to another embodiment of the present invention.
Figure 4B:
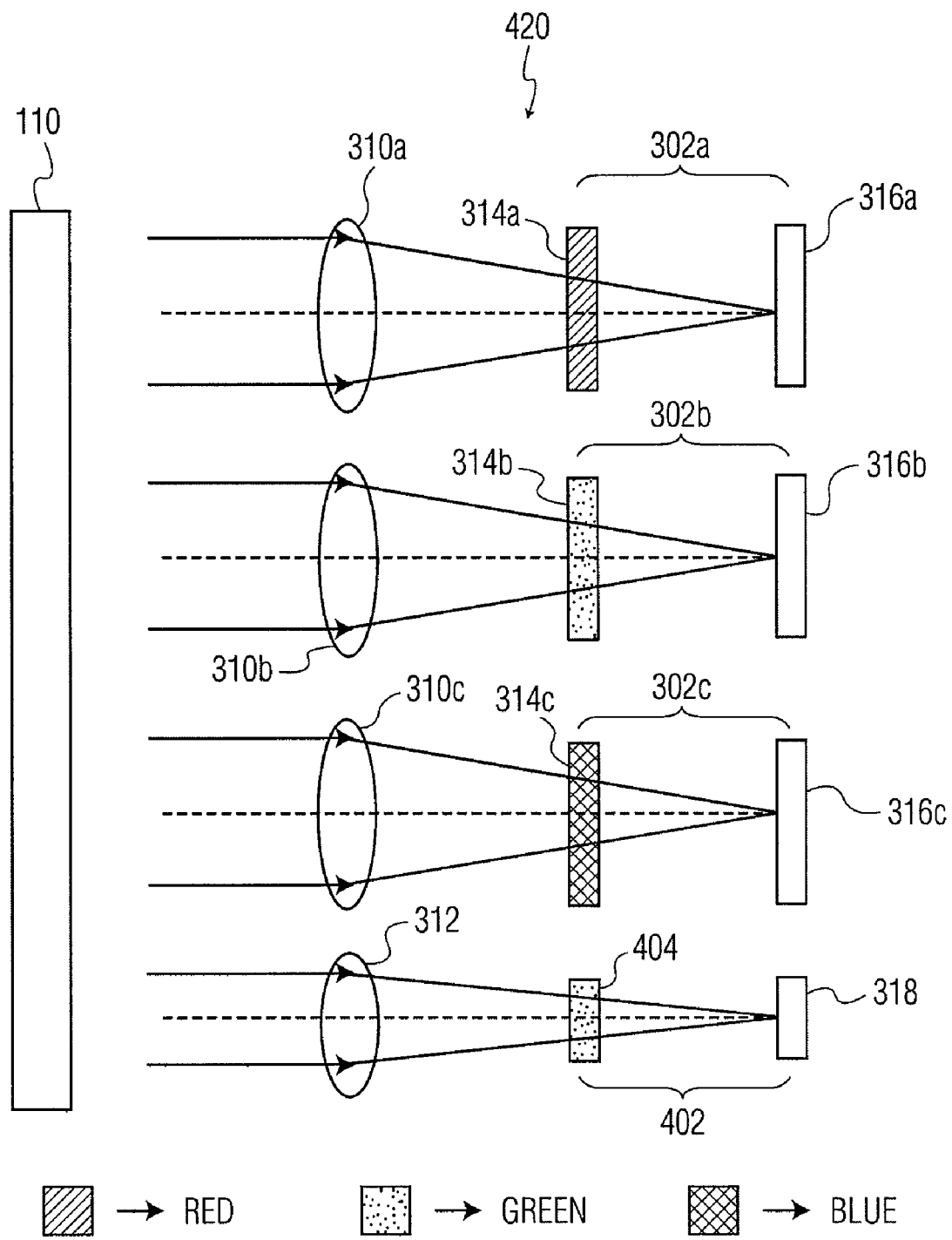
FIG. 4B is a side diagram of an imaging device including the multi-array imaging sensor shown in FIG. 4A.

FIG. 4A is an overhead diagram of a multi-array imaging sensor 400, according to another embodiment of the present invention. FIG. 4B is a side diagram of an imaging device, designated generally as 420, that includes multi-array imaging sensor 400. Multi-array imaging sensor 400 is the same as multi-array imaging sensor 300 (FIGS. 3A and 3B) and imaging device 420 is the same as imaging device 320, except that sub-array 402 includes color filter 404 between lens 312 and pixel array 318. Sub-array 402, thus, provides chrominance information instead of luminance information.

In FIG. 4B, a green color filter 404 is illustrated. Typically, of the light in the visible spectrum, most of the image information is contained in the green light sub-spectrum, as compared with the blue and red light sub-spectrums. It is understood, however, that any suitable color filter may be used for sub-array 402 to provide chrominance information corresponding to chrominance information in at least one of main arrays 302.

For general parallax correction, object distances O vary throughout the scene as a function of x and y position and may be difficult to correct. A case where the objects are mostly in the scene plane at close distances may be considered. In this case, a linear shift typically exists between adjacent captured images. A linear shift parallax error may occur, for example in reading business cards, paper/reading material, computer screens, bar codes, and photos/art work. The proximity of the object to the imaging device typically depends on the distance D between arrays (FIG. 2). For example, if distance D is about 2 millimeters a shift of about 10 pixels at 20 centimeters from the imaging device may occur. At about 1 meter from the imaging device, one pixel or less than one pixel of shift may occur.

Including sub-array 304, 402 (FIGS. 3A and 4A) may allow detection and correction of linear shift parallax. A readout delay memory buffer may be provided for at least one of the main array read-out channels and sub-array 304 (402), because the parallax shift typically occurs in the x direction, described below with respect to FIG. 5. A similar spectral content from the scene may be compared using any suitable matching technique, such as correlation. For example, if green filter 404 is used by sub-array 402 (FIG. 4B) to provide chrominance information, the chrominance information from green array 302B and sub-array 402 may be compared (i.e. correlated) on a row-by-row basis to determine an amount of linear shift between green array 302B and sub-array 402. Once the linear shift is determined, red array 302A and blue array 302C data may be shifted accordingly to compensate for the linear shift parallax, as described further below with respect to FIGS. 5, 6B, 7, and 8.

As another example, if luminance information is detected by sub-array 304 (FIG. 3A), a correlation between luminance information of sub-array 304 and the chrominance information from each of main arrays 302 may be performed, described further below with respect to FIGS. 5, 6A, 7 and 8. Because sub-array 304 includes luminance information for the red, green and blue sub-spectrums, a relative correlation may exist between the luminance information and the chrominance information from each of main arrays 302. The correlations among the main arrays 302 and sub-array 304 may be used to shift red array 302A, green array 302B and blue array 302C to compensate for the linear shift parallax.

For the general case of parallax correction in the x and y positions, it is contemplated that sub-arrays may also be positioned relative to the main arrays with respect to the x axis as well as with respect to the y axis. A similar matching technique may be used with respect to the x and y directions to determine a general parallax correction.

Multi-array imaging sensors 300 and 400 (FIGS. 3A and 4A) include sub-array 304, 402 that is placed in line with main imaging arrays 302, in order to detect a parallax shift of scene content. As shown in FIGS. 3A and 4A, sub-array 304, 402 may include fewer pixels and thus may have a lower resolution as compared with main imaging arrays 302. For example, a smaller sub-array 304, 402 may be provided in order to improve a die area efficiency of the integrated circuit. Even when the resolution of sub-array 304 (402) is less than about half of the resolution of main arrays 302 (with respect to the horizontal and vertical number of pixels), the luminance (chrominance) information provided by sub-array 304 (402) may still provide parallax correction to an accuracy of about +/− one pixel. Although sub-array 304 (402) is shown as being adjacent to blue array 302C, it is understood that sub-array 304 (402) may be positioned between any of main arrays 302A, 302B, and 302C.

Figure 5:
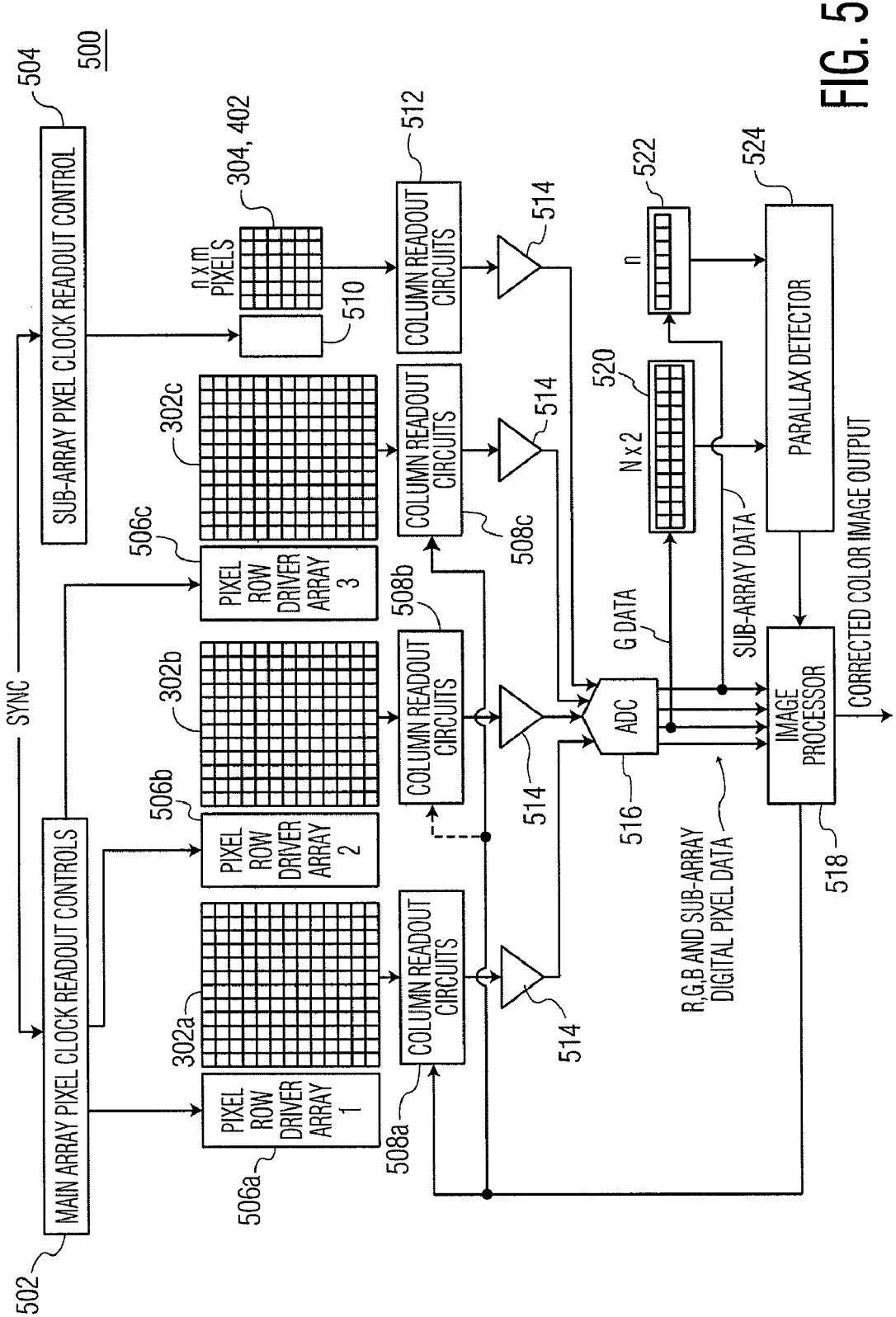
FIG. 5 is a block diagram of an imaging system including the multi-array imaging sensor shown in FIG. 3A or 4A, according to an embodiment of the present invention.

FIG. 5 is a block diagram of an imaging system, generally depicted as 500, and including multi-array imaging sensor 300 or 400 (FIG. 3A or 4A). Imaging system 500 may be a CMOS imaging system or a CCD imaging system. Each imaging array (main array 302 and sub-array 304 or 402) of imaging sensor 300 (400) includes a plurality of pixels arranged in a predetermined number of columns and rows. The pixels of each row in the array are turned on at the same time by a corresponding row select line and the pixels of each column are selected for output by a corresponding column select line. A plurality of row and column lines are provided for each imaging array.

Each main array row lines are selectively activated by row drivers 506a, 506b, 506c in response to row address decoders (not shown) and the column select lines are selectively activated by column readout circuits 508a, 508b, 508c in response to the respective column address decoders (not shown). Thus, a row and column address is provided for each pixel of each main array 302. Similarly, a row and column address is provided for each pixel of sub-array 304 (402) by row driver 510 and column readout circuit 512. Imaging device 500 is operated by a control circuit (not shown), which controls the address decoders for selecting the appropriate row and column lines for pixel readout, and row drivers 506, 510 and column readout circuitry 508, 5012, which apply driving voltages to the drive transistors of the selected row and column lines. Image processor 518 also control column readout circuitry 508 of main arrays 302 for parallax correction.

A signal is produced by respective amplifiers 514 for each pixel of each imaging array, which is digitized by analog-to-digital converter 516 (ADC). ADC 516 supplies the digitized red, green, blue main array pixel data and sub-array pixel signals to image processor 518, which forms and outputs a digital image by combining the red, green and blue main array digital pixel data.

Separate readout controls 502 and 504 are used to control the clock rates of respective main arrays 302 and sub-array 304 (402). As described above, sub-array 304 (402) has a reduced resolution as compared with main array 302. In order to detect for parallax, the readout speed of main arrays 302 and sub-array 304 (402) are set equal on a row-by-row basis. By setting the readout speeds equal, a correlation between luminance/chrominance information of sub-array 304 (402) and chrominance information of the corresponding main array 302 may be determined. If the readout speed of sub-array 304 (402) is faster than the readout speed of main array 302, the sub-array data may be buffered. Accordingly, a main array clock rate (F1) set by readout control 502 may be different from sub-array clock rate (F2) set by readout control 504, described further below with respect to FIG. 9. A synchronization control signal may also be provided to readout clock circuits 502 and 504 to synchronize the pixel readout from main array 302 and sub-array 304 (402).

Imaging system 500 also includes main array memory 520 for storing two rows, N×2, of digitized main array data of N×M pixels and sub-array memory 522 for storing one row, n×1, of digitized sub-array data of n×m pixels, N, M, n and m are integer values. Main array memory 520 includes two line buffers so that the digitized main array row data may be averaged, i.e. binned, to match the resolution of the digitized sub-array data for parallax detection. The main array data from main array memory 520 and the sub-array data from sub-array memory 522 are provided to parallax detector 524.

Although one main array memory 520 is shown to store color information from green array 302B (when chrominance information of the green sub-spectrum is received from sub-array 402), it is understood that further main array memories 520 may be included to store color information from each of the main arrays 302A, 302B, 302C and provided to parallax detector 524 in order to correlate the color information from each main array 302 with luminance information from sub-array 304.

Parallax detector 524 receives color information from at least one main array 302, for example, green digital pixel data from green array 302b, and luminance information or chrominance information from respective sub-arrays 304 or 402. Parallax detector 524 performs a correlation to determine a maximum linear pixel shift between the at least one main array 302 and sub-array 304 (402). Once the pixel shift is determined, parallax detector determines red and blue array column shift values for a following frame and provides the column shift values to image processor 518. Parallax detector 524 may also determine a green array column shift value. Image processor 518 provides the red and blue column shift values to the corresponding column readout circuits 508A and 508C to shift the red and blue channels for the next frame and align the image outputs to correct for linear shift parallax. Image processor 518 may optionally provide a green column shift value to column readout circuit 508b.

Figure 6A:
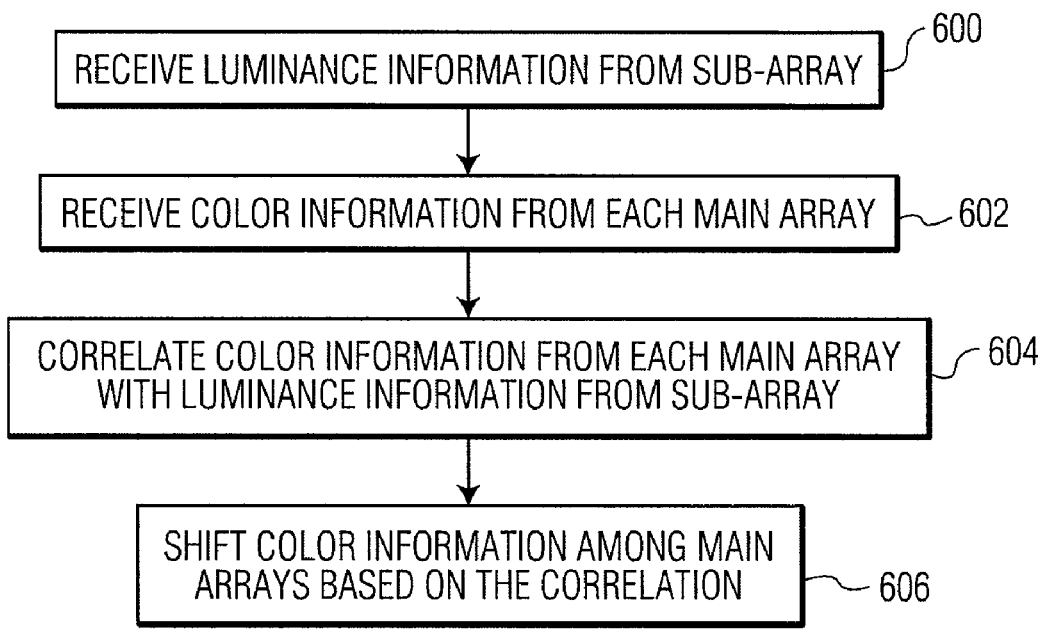
FIG. 6A is a flow chart illustrating a method for correcting parallax according to an embodiment of the present invention.

FIG. 6A is a flowchart illustrating a method for correcting parallax according to an embodiment of the present invention, using multi-array imaging sensor 300 (FIG. 3A). The steps illustrated in FIG. 6A merely represent an embodiment of the present invention. It is understood that certain steps may be performed in an order different from what is shown.

In step 600, luminance information is received from sub-array 304, for example, from sub-array memory 522 (FIG. 5). In step 602, color information is received from each of the main arrays 302a, 302b and 302c, for example from corresponding main array memories 520 (FIG. 5).

In step 604, color information from each main array 302a, 302b, 302c is correlated with luminance information from sub-array 304, for example by parallax detector 524 (FIG. 5). In step 606, color information among main arrays 302 are shifted based on the correlation determined in step 604. For example, column shift values may be appropriately applied to column readout circuits 508a, 508c of respective red array 302a and blue array 302c.

Figure 6B:
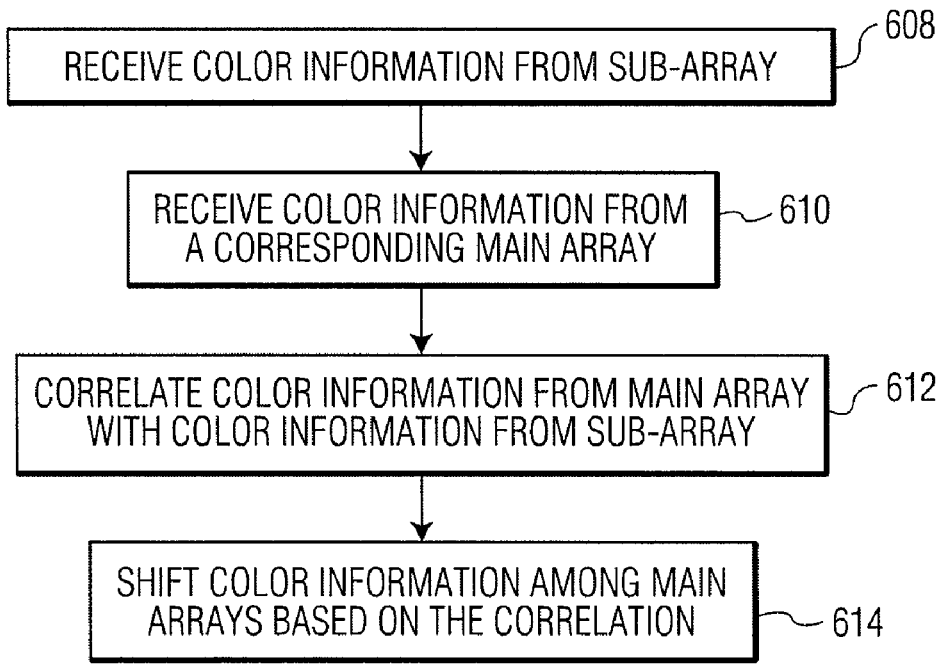
FIG. 6B is a flow chart illustrating a method for correcting parallax according to another embodiment of the present invention.

FIG. 6B is a flow chart illustrating a method for correcting parallax according to another embodiment of the present invention, using multi-array imaging sensor 400 (FIG. 4A). The steps illustrated in FIG. 6B merely represent an embodiment of the present invention and it is understood that certain steps may be performed in an order different from what is shown.

In step 608, color information is received from sub-array 402, for example from sub-array memory 522 (FIG. 5). In step 610, color information is received from a corresponding main array, such green array 302B, for example, from main array memory 520 (FIG. 5).

In step 612, color information from main array 302B is correlated with color information from sub-array 402, for example, by parallax detector 524 (FIG. 5). In step 614, color information among main arrays 302 are shifted based on the correlation performed in step 612. For example, column shift values may be appropriately applied to column readout circuits 508a, 508c of respective red array 302a and blue array 302c.

Figure 7:
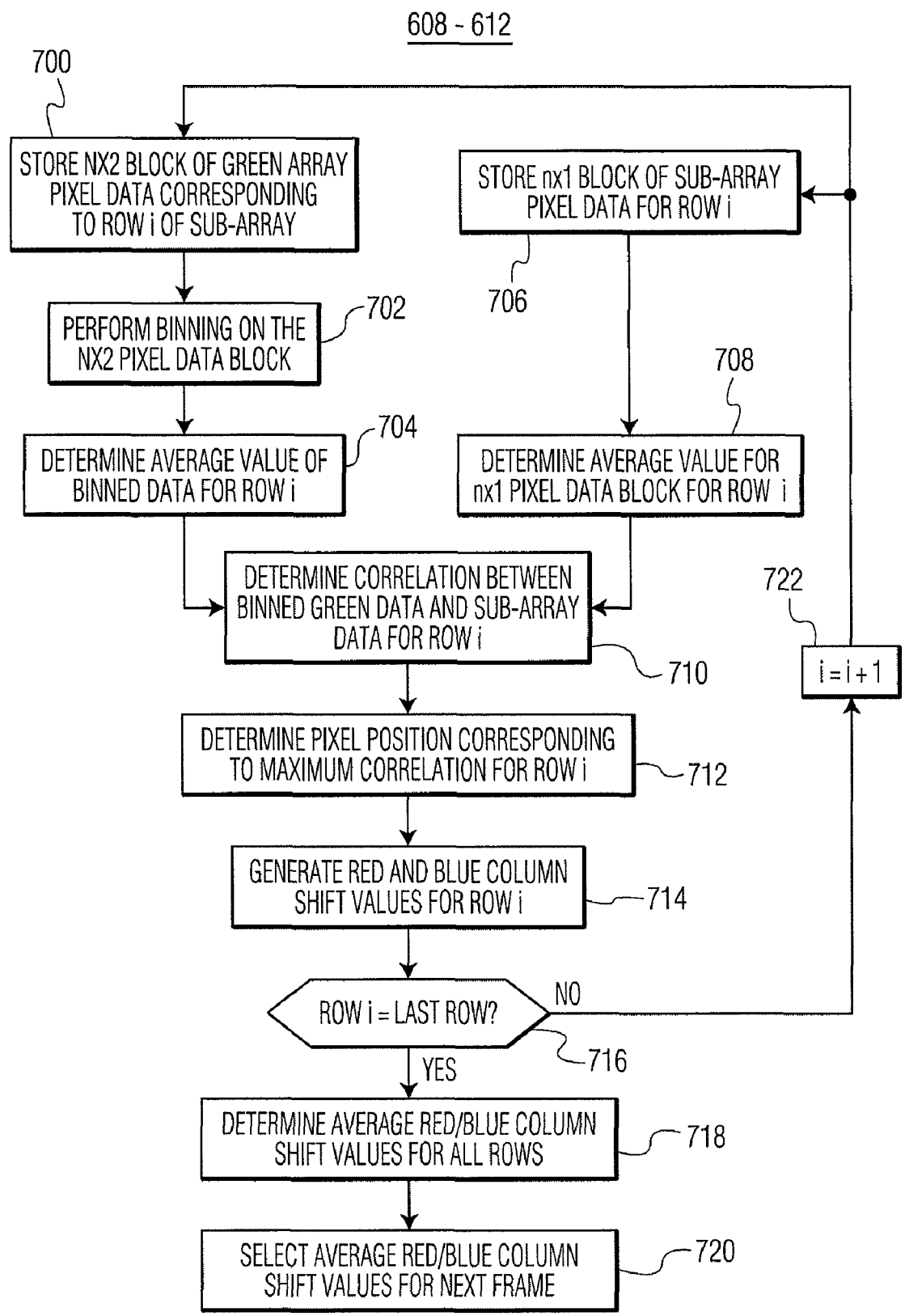
FIG. 7 is a flow chart illustrating a method for determining a shift in color information for imaging arrays in the multi-array sensor shown in FIG. 4A.

FIG. 7 is a flowchart illustrating a method for determining a shift in color information for imaging arrays 302 of multi-array sensor 402, i.e. steps 608-612 (FIG. 6B). The steps illustrated in FIG. 7 merely represent an embodiment of the present invention. It is understood that certain steps may eliminated or be performed in an order different from what is shown.

In step 700, an N×2 block of green array pixel data (from green array 302b) that corresponds to row i of sub-array 402 is stored, for example, in main array memory 520 (FIG. 5). In step 702, binning is performed on the N×2 pixel data block, for example, by parallax detector 524 (FIG. 5). The binning operation performed in step 702, for example, averages 2×2 pixels in main array memory 520 to provide signal f(i), for row i=1 2 N/2. In step 704, an average value, $\bar{f}$, is determined for the binned data (corresponding to row i) stored in main array memory 520.

In step 706, an n×1 block of sub-array pixel data (from sub-array 402) is stored for row i as signal g(i), for example, in sub-array memory 522 (FIG. 5). In step 708, an average value, $\bar{g}$, is determined for the n×1 pixel data block (corresponding to row i) stored in sub-array memory 522.

In step 710, a correlation is determined between binned green data, f(i) (step 702) and sub-array data, g(i) (step 706) for row i. In the correlation, the average value $\bar{f}$ (step 704) is subtracted from binned green data f(i) and the average value $\bar{g}$ (step 708) is subtracted from sub-array pixel data g(i). The correlation is generally shown in equation 3 as:

$$p(j) = \sum_{i=1}^{Pmax} (f(i) - \bar{f})(g(i-j) - \bar{g}), \text{ for } j = 1, 2, \ldots, Pmax \quad (3)$$

In equation (3), Pmax may be set to N/2 or to a maximum parallax that may be corrected. For example, if a maximum parallax that may be corrected is set to 20 pixels, then 20 integrations of f(i) and g(i) may be performed as opposed to an upper limit of N/2. Accordingly, by limiting the upper summation limit to Pmax, a smaller number of integrations may be performed for each row, allowing for a more feasible hardware circuit for the calculation.

In step 712, a pixel position corresponding to the maximum correlation is determined for row i. For example, the pixel position can be determined by parallax detector 524 from the maximum correlation based on the distance from green array 302B to sub-array 402 (FIG. 5). In step 714, red and blue column shift values are determined for row i, based on the pixel position determined in step 712, for example, by parallax detector 524 (FIG. 5). Because a distance from green array 302B to red array 302A and blue array 302C are known, the corresponding column shift for red array 302A and blue array 302C may be determined based on the known distances and the pixel position.

In step 716, it is determined whether row i is the last row of sub-array 402. If it is determined that row i is the last row, step 716 proceeds to step 718. In step 718, an average red column shift value and an average blue column shift value is determined from among the red and blue shift values determined for each of the rows. In step 720, the average red and blue column shift values are selected for the next frame, for example by providing the average red and blue column shift values to image processor 518 (FIG. 5).

If it is determined that row i is not equal to the last row, step 716 proceeds to step 722 to increment row i and steps 700-716 are repeated.

As shown in FIG. 7, the red and blue column shift values are found for each sub-array row and averaged over the entire frame, to arrive at final column shift values that are applied on the following frame. Although FIG. 7 illustrates that all rows are read, it is understood that a number of rows used to detect linear shift parallax is not limited to reading all rows. A sub-sampling of every $m^{th}$ row may be performed to allow enough time to perform the Pmax summation (eq. 3). For example, every $16^{th}$ row may be used to detect parallax, thereby providing 16 rows of readout time to determine the correlation. This may reduce circuit complexity and a required computation speed for the parallax correction.

Although FIG. 7 illustrates storing an N×2 block of green array pixel data and performing correlation for sub-array 402, it is understood that similar steps as steps 700-722 n may be performed when luminance information from sub-array 304 is received. For example, step 702-704 may be repeated for each of the red array 302, green array 302B and blue array 302C (FIG. 5). Step 710 may perform a correlation between the sub-array data determined in steps 706 and 708 and each of binned red data, binned green data and binned blue data for row i, using equation (3). Step 712 may determine relative pixel positions for each of the red, blue and green arrays based on a corresponding maximum correlation and step 714 may generate red and blue column shift values for row i from the relative pixel positions. Steps 716-722 may be repeated as described above.

Figure 8:
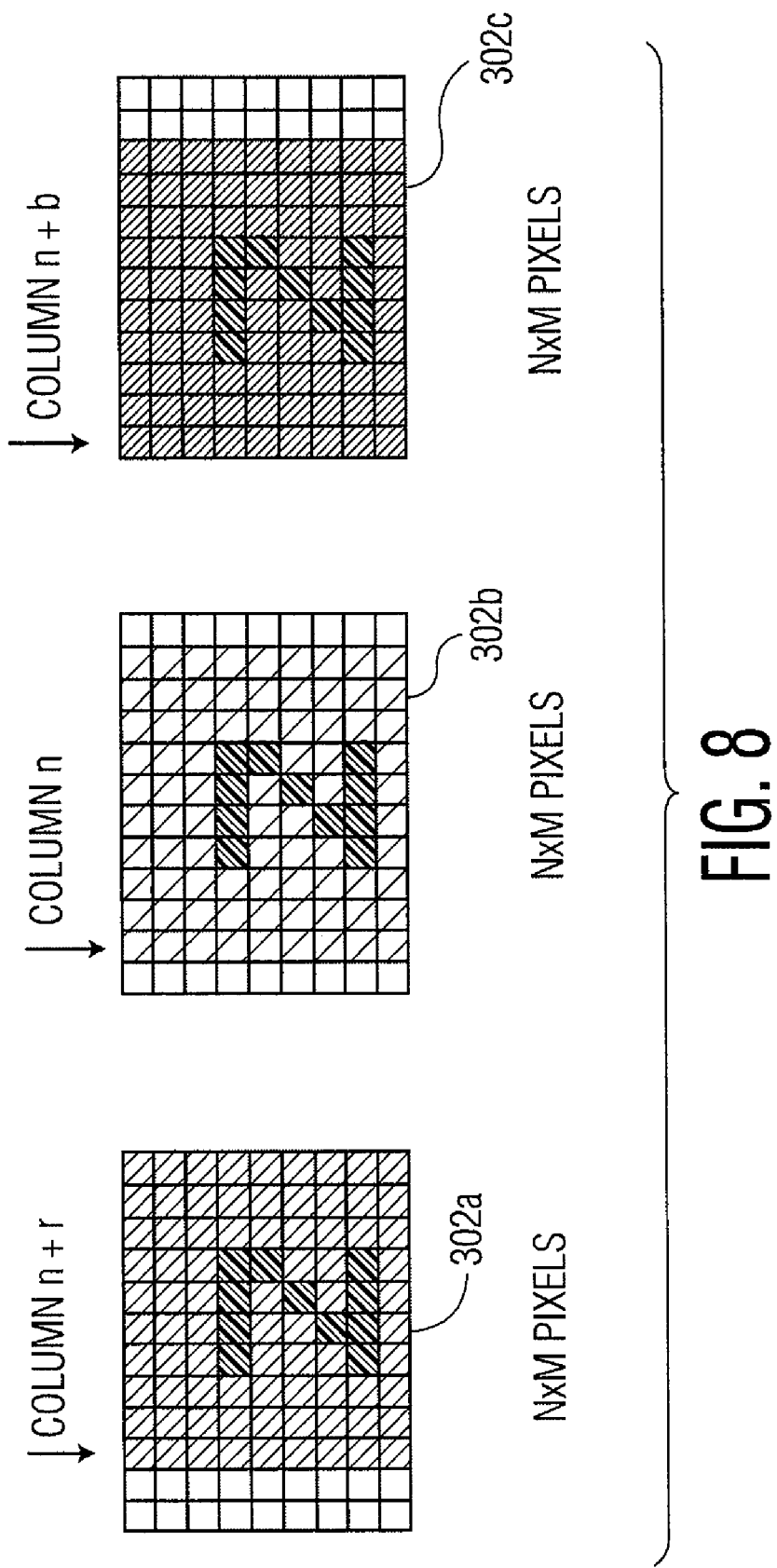
FIG. 8 is an example of color information shift applied to imaging arrays of the multi-array imaging sensor shown in FIG. 3A or 4A, based on parallax correction.

FIG. 8 is an example of column shift values, i.e. color information shift, applied to red array 302A and blue array 302C of multi-array imaging sensor 304 or 402 (FIG. 3A or 4A). In FIG. 8, red array 302A is read out at a higher column number, n+r, to correct for parallax. Green array 302B is read out from a default column address. Blue array 302C is read out starting at a lower column number, n+b, to correct for parallax.

In FIG. 8, the red image from red array 302A is shifted one pixel to the right and the blue image from blue array 302C is shifted one pixel to the left compared with the green image from green array 302B. In this example, parallax detection provides a value of r=+1 to start the red array readout window at column n+1 and a value of b=−1 to start the blue array readout window at column n−1. The combined red, green and blue pixel data, with the shifted column start addresses for the red and blue arrays, results in a parallax correction image.

As discussed above, sub-array 304 (402) (FIG. 5) has a reduced resolution as compared with main arrays 302, and thus may have a different readout frame rate. In one example, sub-array 304 (402) is one-half of the resolution in horizontal and vertical directions of main arrays 302. In this example, the sub-array frame rate is increased by a factor of four, if the same pixel clock signal is not used for main array 302 and sub-array 304 (402) read out.

In another embodiment, sub-array 304 (402) may be used as a photometer. As a photometer, sub-array 304 (402) may be used to determine an appropriate exposure level setting for main arrays 302, by capturing several frames and adapting before a full main array exposure is set. The high speed exposure assistance may improve auto exposure settling times for imaging system 500, thus improving an overall adapted capture speed.

Figure 9:
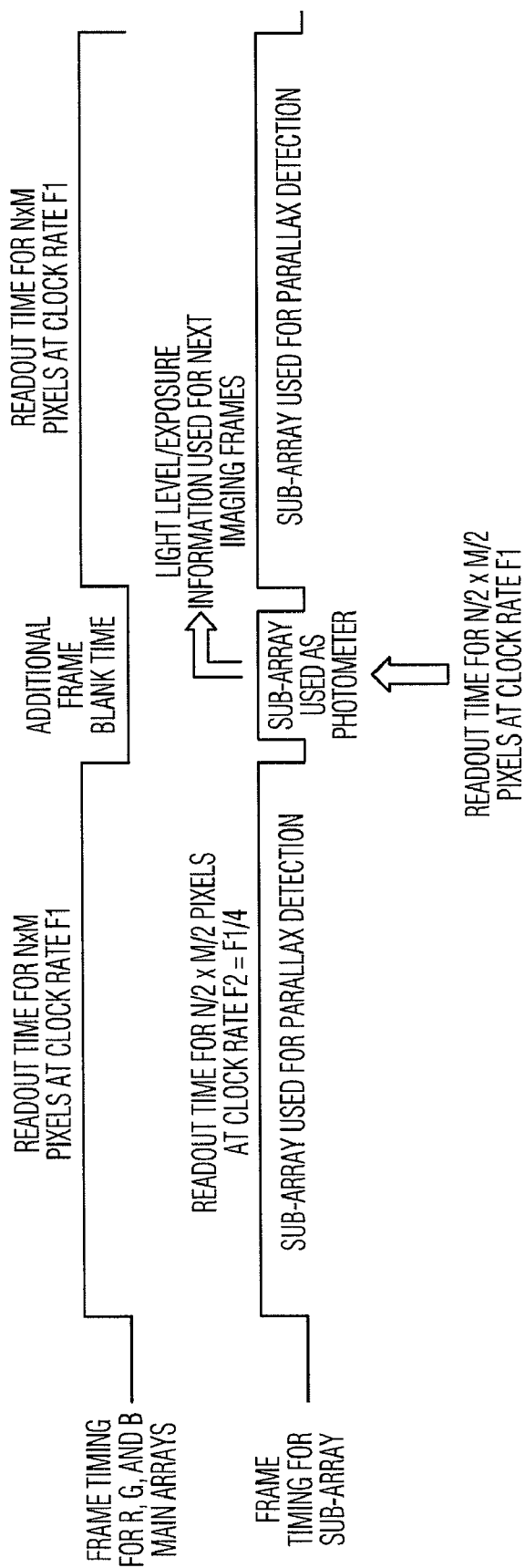
FIG. 9 is a timing diagram of frame timing signals versus clock rate for controlling readout speeds of the imaging arrays shown in FIG. 3A or 4A.

Accordingly, a readout pixel seed of sub-array 304 (402) may be set different from the main arrays 302 in certain frames between parallax correction, to allow for photometer operation. FIG. 9 is a timing diagram of frame timing signals versus clock rate for controlling readout speeds of main arrays 302 and sub-array 304 (402) (FIG. 5). By having sub-array 304 (402) under an independent readout speed control, sub-array 304 (402) may be read at different speeds during its operation to achieve both photometer functionality and parallax correction.

As shown in FIG. 9, during parallax detection/correction, main arrays 302 are read at a clock rate of F1 and sub-array 304 (402) is read at a clock rate of F2=F1/4. Accordingly, during parallax correction sub-array 304 (402) is read at a same speed as main arrays 302.

During an additional frame blank time, sub-array 304 (402) is used as a photometer and pixels are read from sub-array 304 (402) at clock rate F1, i.e. at a different speed then main arrays 302. During photometer operation, sub-array 304 (402) may use light level and/or exposure information in order to set an exposure setting for the next imaging frames.

Sub-array 304 (402) may also be used in low light situations by combining the digitized sub-array data with the digitized main array data (FIG. 5). This may improve a sensitivity of multi-array imaging sensor 300 (400), with a tradeoff in resolution, depending on the size of sub-array 304 (402).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of correcting parallax in an imaging system comprising the steps of:
    receiving color information from multi-array sensors arranged on a substrate;
    receiving luminance information from a sub-array sensor arranged with the multi-array sensors on the substrate;
    correlating color information received from at least one of the multi-array sensors with the luminance information received from the sub-array sensor; and
    shifting the color information among the multi-array sensors, based on the correlation, to correct the parallax and prior to receiving the color information from the multi-array sensors and luminance information from the sub-array sensor, the step includes:
    setting a read out speed of the sub-array sensor faster than a read out speed of the multi-array sensors in a first time interval,
    setting a read out speed of the sub-array sensor substantially equal to a read out speed of the multi-array sensors in a second time interval.

2. The method according to claim 1, after shifting the color information, the method comprising:
    setting a read out speed of the sub-array sensor faster than a read out speed of the multi-array sensors;
    receiving an amount of light onto the sub-array sensor; and
    determining an exposure time for the multi-array sensors based on the amount of received light.

3. The method according to claim 1, further comprising:
    detecting a low light condition based on at least one of the received color information or the received luminance information; and
    combining the luminance information with the color information from the multi-array sensors when the low light condition is detected.

4. The method according to claim 1, wherein receiving luminance information from the sub-array sensor includes filtering the luminance information by a color filter, and
    correlating the color information includes correlating the color information received from the at least one of the multi-array sensors with the filtered luminance information received from the sub-array sensor.

5. A method of correcting parallax in an imaging system comprising the steps of:
    receiving color information from multi-array sensors arranged on a substrate;
    receiving luminance information from a sub-array sensor arranged with the multi-array sensors on the substrate;
    correlating color information received from at least one of the multi-array sensors with the luminance information received from the sub-array sensor; and
    shifting the color information among the multi-array sensors, based on the correlation, to correct the parallax;
    wherein correlating the color information includes:
    receiving a row of the luminance information from the sub-array sensor;
    receiving two or more rows of the color information from the at least one multi-array sensor corresponding to the row of the luminance information;
    binning the two or more rows of the color information;
    correlating the binned color information with the row of the luminance information to determine a maximum correlation value;
    determining a pixel shift in the at least one multi-array sensor from the maximum correlation value; and
    determining average column shift values for the multi-array sensors from the pixel shift value for a number of rows of the luminance information; and
    the color information is shifted based on the average column shift values.

6. An imaging system comprising:
    multi-array sensors, arranged on a substrate, configured to produce color information per each array sensor;
    a sub-array sensor; arranged with the multi-array sensors on the substrate, configured to produce luminance information; and
    a processor configured to (a) receive color information from at least one array sensor of the multi-array sensors and the luminance information from the sub-array sensor, and (b) correlate the received color information with the luminance information to detect parallax between the one array sensor and the sub-array sensor;

wherein the processor is configured to shift the color information among the multi-array sensors, based on the detected parallax; and first and second clock readout control circuits are configured to separately control clock rates of the multi-array sensors and the sub-array sensor, respectively;

wherein the first and second clock rates are different in a first time interval and are the same in a second time interval.

7. The imaging system according to claim 6, wherein each array sensor includes a different monochromatic color filter to produce the corresponding color information.

8. The imaging system according to claim 6, wherein:
the sub-array sensor includes a color filter to filter the luminance information, and
the processor correlates the received color information with the filtered luminance information to detect the parallax between the at least one array sensor and the sub-array sensor.

9. The imaging system according to claim 6, wherein a resolution of the sub-array sensor is less than a resolution of the multi-array sensors.

10. The imaging system according to claim 6, further comprising:
the first and second column readout circuitry configured to reading out respective multi-array pixel signals of the multi-array sensors corresponding to a selected row and respective columns of the multi-array sensors;
the second column readout circuitry configured to read out a sub-array pixel signal of the sub-array sensor corresponding to the selected row and a respective column of the sub-array sensor;
amplifiers configured to output amplified multi-array pixel signals and a sub-array pixel signal received from the first and second column readout circuitry;
an analog-to-digital (ADC) converter configured to convert the amplified multi-array pixel signals and amplified sub-array pixel signal to respective digitized multi-array pixel signals and a digitized sub-array pixel signal; and
an image processor configured to combine the digitized pixel signals from the multi-array sensors into a digital image.

11. The imaging system according to claim 10, wherein the processor provides respective column shift values for at least one of the multi-array sensors to the image processor, and the image processor provides a control signal to the first column readout circuitry to shift the respective columns of the at least one of the multi-array sensors based on the column shift values.

12. A method of correcting parallax in an imaging system comprising the steps of:
in a first time interval:
setting a read out speed of a sub-array sensor faster than a read out speed of multi-array sensors, and
receiving an amount of light onto the sub-array sensor; and
in a second time interval:
setting a read out speed of the sub-array sensor substantially equal to the read out speed of the multi-array sensors,
receiving color information from the multi-array sensors and luminance information from the sub-array sensor, and
correcting the parallax in the received color information from the multi-array sensors based on a color information received from the multi-array sensors and the luminance information received from the sub-array sensor.

13. The method according to claim 12, wherein, in the first time interval, receiving the amount of light onto the sub-array sensor includes:
determining an exposure time for the multi-array sensors based on the amount of received light; and
setting the exposure time for the multi-array sensors for the second time interval.

14. The method according to claim 13, wherein, in the second time interval, correcting the parallax includes:
correlating the color information received from at least one of the multi-sensor arrays with the luminance information received from the sub-array; and
shifting the color information among the multi-array sensors, based on the correlation.

15. The method according to claim 14, further including combining the shifted color information from the multi-array sensors to generate an image.

16. The method according to claim 14, further including:
detecting a low light condition based on at least one of the received color information or the received luminance information;
combining the luminance information from the sub-array sensor with the shifted color information from the multi-array sensors when the low light condition is detected.

17. The method according to claim 14, wherein receiving luminance information from the sub-array sensors includes filtering the luminance information by a color filter, and
correlating the color information includes correlating the color information received from the at least one of the multi-array sensors with the filtered luminance information received form the sub-array sensor.

* * * * *